US005639967A

United States Patent [19]
Alexis

[11] Patent Number: 5,639,967
[45] Date of Patent: Jun. 17, 1997

[54] MOTOR VEHICLE TIME SPEED RECORDER

[76] Inventor: Errol Alexis, 204-15 Foothill Ave., Apt. A-53, Hollis, N.Y. 11423

[21] Appl. No.: 570,413

[22] Filed: Dec. 11, 1995

[51] Int. Cl.$^6$ .............................. G01P 13/00; G01D 9/28; G01D 9/36; G01D 15/16
[52] U.S. Cl. .................. 73/489; 73/491; 346/49; 346/59; 346/115
[58] Field of Search ..................... 73/489, 491, 498, 73/2; 346/18, 49, 59, 112, 115

[56] References Cited

U.S. PATENT DOCUMENTS

| | | | |
|---|---|---|---|
| 1,458,451 | 6/1923 | Wallbillich | 346/18 |
| 1,466,050 | 8/1923 | Koski | 346/18 |
| 2,577,950 | 12/1951 | Clark | 346/18 |
| 3,599,224 | 8/1971 | Hahn | 346/61 |
| 3,634,866 | 1/1972 | Meyer | 346/33 R |
| 3,805,270 | 4/1974 | Grant et al. | 346/44 |
| 3,855,599 | 12/1974 | Helmschrott et al. | 346/62 |
| 4,083,052 | 4/1978 | Metcalf | 346/18 |
| 4,093,939 | 6/1978 | Mitchell | 340/439 |
| 4,212,016 | 7/1980 | Ruhl | 346/62 |
| 4,331,965 | 5/1982 | Schultze | 346/121 |
| 4,644,368 | 2/1987 | Mutz | 346/33 D |
| 4,656,488 | 4/1987 | Ruhl | 346/49 |
| 4,782,691 | 11/1988 | Clish | 73/117.3 |

*Primary Examiner*—Hezron E. Williams
*Assistant Examiner*—Richard A. Moller
*Attorney, Agent, or Firm*—Richard L. Miller, P.E.

[57] ABSTRACT

A motor vehicle time speed recorder that includes a hollow parallelepiped-shaped housing, time apparatus, speed apparatus, graphical time apparatus, and graphical speed apparatus. The hollow parallelepiped-shaped housing has a front with an elongated slot and a side with an aperture. The time apparatus is responsive to the time of day. The time apparatus is disposed in the hollow parallelepiped-shaped housing and generates a time signal, so that the time of day can be monitored. The speed apparatus is responsive to the speed of the motor vehicle. The speed means is disposed in the hollow parallelepiped-shaped housing and receives a speed signal, so that the speed of the vehicle can be monitored. The graphical time apparatus graphically represents the time signal generated by the time apparatus and is disposed in the hollow parallelepiped-shaped housing, so that the time of day can be graphically represented. And, the graphical speed apparatus graphically represents the speed signal generated by the speed means and is disposed in the hollow parallelepiped-shaped housing, so that the speed of the motor vehicle can be graphically represented.

19 Claims, 1 Drawing Sheet

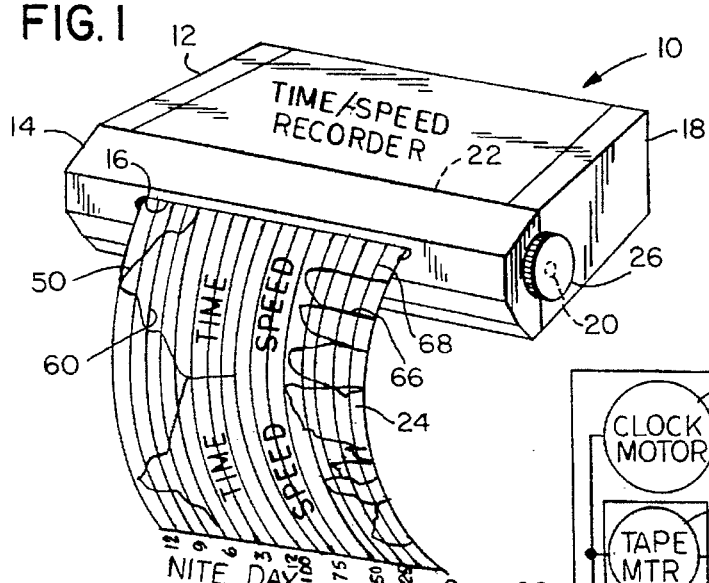
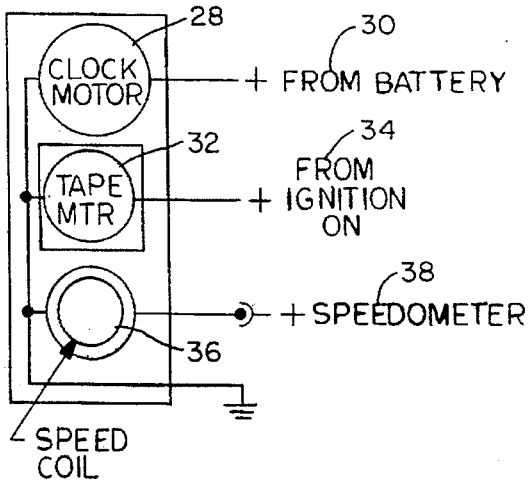
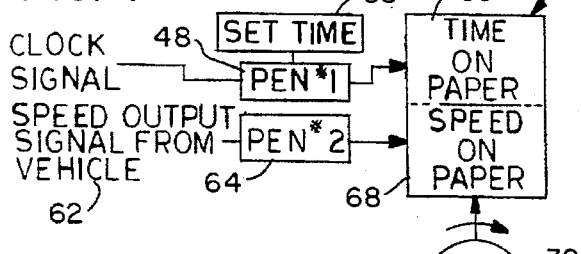
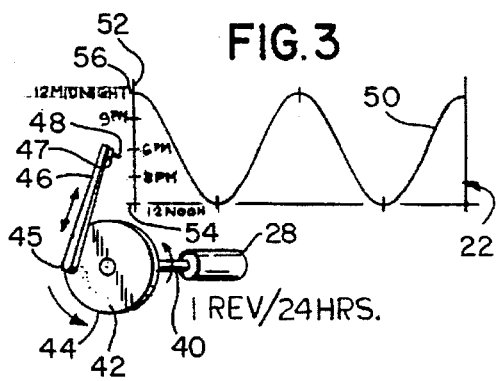
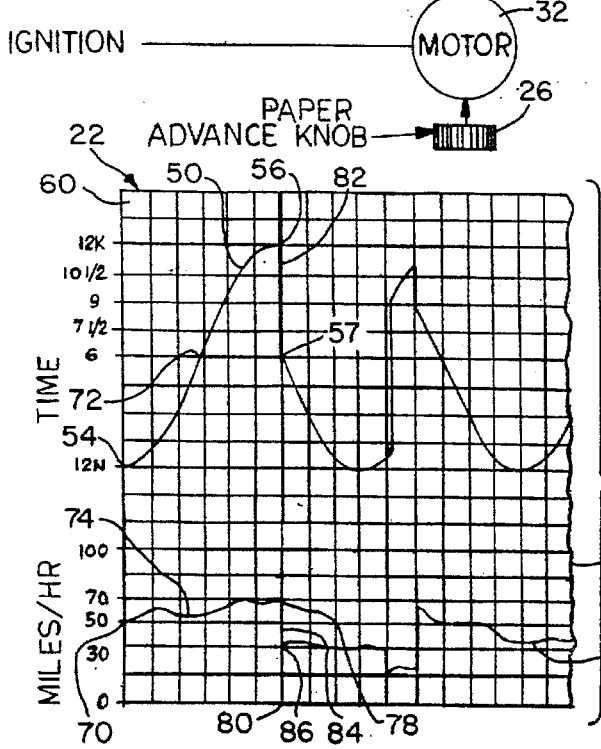

5,639,967

MOTOR VEHICLE TIME SPEED RECORDER

BACKGROUND OF THE INVENTION

The present invention relates to a motor vehicle time speed recorder. More particularly, the present invention relates to a motor vehicle time speed recorder that generates a pair of synchronized graphical printouts one of which is the time of day as a substantial sine wave and the other is a corresponding vehicle speed curve.

With the current speed laws many motorist are at the mercy of law enforcement officers who assert that the motorist was in violation of such speed laws. Additionally, many speed laws are time related, that is, the speed restriction may only be in effect during certain times of the day.

When a motorist is issued a citation for violating a speed law, the violation can be quite costing both in payment of the fine and in a liability insurance penalty. When the motorist feels that he was not in violation of a speed law, however, he must appear before a judge who will hear his side of the story together with that of the law enforcement officer who issued the citation. The cited motorist must attempt to present a persuading argument and provide any supporting documentation that he may possess.

Further, many employees of transportation companies, such as but not limited to taxis, buses, chauffeurs, and the like can be at times derelict in their duties. They can be dangerously speeding. They can be responsible for useless idling and wasting valuable gasoline, especially in these times of fear of exhaustion of natural resources. They can be not operating their vehicle when they are supposed to.

SUMMARY OF THE INVENTION

Accordingly, an object of the present invention is to provide a motor vehicle time speed recorder that avoids the disadvantages of the prior art.

Another object of the present invention is to provide a motor vehicle time speed recorder that is simple and inexpensive to manufacture.

Still another object of the present invention is to provide a motor vehicle time speed recorder that is simple to use.

Yet another object of the present invention is to provide a motor vehicle time speed recorder that can provide the actual speed of a motor vehicle and the corresponding time of day.

Still yet another object of the present invention is to provide a motor vehicle time speed recorder that can provide support for a motorist who has been cited for violating a speed law.

Yet still another object of the present invention is to provide a motor vehicle time speed recorder that provides permanent documentation for courts and the like.

Still yet another object of the present invention is to provide a motor vehicle time speed recorder that allows an employer of a transportation company to control an employee's vehicle operating performance and prevent dereliction of duty.

Yet still another object of the present invention is to provide a motor vehicle time speed recorder that can determine if an employee of a transportation company has been dangerously speeding.

Still yet another object of the present invention is to provide a motor vehicle time speed recorder that can determine if an employee of a transportation company is responsible for useless idling and wasting valuable gasoline.

Yet still another object of the present invention is to provide a motor vehicle time speed recorder that can determine if an employee of a transportation company is not operating their vehicle when they are supposed to.

Briefly stated, still yet another object of the present invention is to provide a motor vehicle time speed recorder that includes a hollow parallelepiped-shaped housing, time apparatus, speed apparatus, graphical time apparatus, and graphical speed apparatus.

Yet still another object of the present invention is to provide a motor vehicle time speed recorder wherein the hollow parallelepiped-shaped housing has a front with an elongated slot and a side with an aperture.

Still yet another object of the present invention is to provide a motor vehicle time speed recorder wherein the time apparatus is responsive to the time of day.

Yet still another object of the present invention is to provide a motor vehicle time speed recorder wherein the time apparatus is disposed in the hollow parallelepiped-shaped housing and generates a time signal, so that the time of day can be monitored.

Still yet another object of the present invention is to provide a motor vehicle time speed recorder wherein the speed apparatus is responsive to the speed of the motor vehicle.

Yet still another object of the present invention is to provide a motor vehicle time speed recorder wherein the speed means is disposed in the hollow parallelepiped-shaped housing and receives a speed signal, so that the speed of the vehicle can be monitored.

Still yet another object of the present invention is to provide a motor vehicle time speed recorder wherein the graphical time apparatus graphically represents the time signal generated by the time apparatus and is disposed in the hollow parallelepiped-shaped housing, so that the time of day can be graphically represented.

Yet still another object of the present invention is to provide a motor vehicle time speed recorder wherein the graphical speed apparatus graphically represents the speed signal generated by the speed means and is disposed in the hollow parallelepiped-shaped housing, so that the speed of the motor vehicle can be graphically represented.

Still yet another object of the present invention is to provide a motor vehicle time speed recorder wherein the time apparatus includes a continuously running clock motor that has a longitudinal shaft that extends therefrom and is powered directly by the battery of the motor vehicle regardless of the position of the ignition switch of the motor vehicle.

Yet still another object of the present invention is to provide a motor vehicle time speed recorder wherein the time apparatus further includes a circular disk with a perimeter and a center.

Still yet another object of the present invention is to provide a motor vehicle time speed recorder wherein the time apparatus further includes a elongated slender arm with a proximal end and a distal end.

Yet still another object of the present invention is to provide a motor vehicle time speed recorder wherein the speed apparatus includes a speed coil that receives the speed signal from the speedometer of the motor vehicle.

Still yet another object of the present invention is to provide a motor vehicle time speed recorder wherein the graphical time apparatus includes a pen that is fixedly attached to the distal end of the elongated slender arm of the time apparatus.

Yet still another object of the present invention is to provide a motor vehicle time speed recorder the tape motor is powered by the battery of the motor vehicle and is in series with the car ignition switch of the motor vehicle, so that the tape motor is operative only when the ignition switch of the motor vehicle is in the on position and since the speed coil receives the speed signal from the speedometer of the motor vehicle and not from a tachometer, the speed coil operates only when the motor vehicle is in movement and not when it is idling.

Still yet another object of the present invention is to provide a motor vehicle time speed recorder that further includes a paper tape advance knob that extends through the aperture of the side of the hollow parallelepiped-shaped housing and is operatively connected to the roll of recording paper tape, so that the roll of recording paper tape can be manually advanced through the elongated slot of the front of the hollow parallelepiped-shaped housing.

Yet still another object of the present invention is to provide a motor vehicle time speed recorder wherein the roll of recording paper tape is divided into two longitudinal graphical portions, so that since the continuously running clock motor of the time apparatus revolves once every twenty four hours and since the elongated rod of the time apparatus is pivotally mounted to the perimeter of the circular disk of the time apparatus, the graphical plot drawn by the pen of the graphical time apparatus on the one of the two longitudinal graphical portions of the roll of recording paper tape is substantially sinusoidal when the tape motor is operative.

Still yet another object of the present invention is to provide a motor vehicle time speed recorder wherein since the continuously running clock motor of the time apparatus runs continuously regardless of what position the ignition switch of the motor vehicle is in and since the tape motor runs only when the conventional car ignition switch is in the on position, when the tape motor is not running, the pen of the graphical time apparatus draws only one oscillating vertical line on the one of the two longitudinal graphical portions of the roll of recording paper tape each time the ignition switch of the motor vehicle is in the off position, so that the roll of recording paper tape is not advanced and unnecessarily used when the motor vehicle is not running.

Yet still another object of the present invention is to provide a motor vehicle time speed recorder wherein another one of the two longitudinal graphical portions of the roll of recording paper tape displays a speed graphical plot created by the speed apparatus, the speed graphical plot of the another one of the two longitudinal graphical portions of the roll of recording paper tape is disposed on the roll of recording paper tape in a synchronous position to the time graphical plot of the one of the two longitudinal graphical portions of the roll of recording paper tape, so that the speed of the motor vehicle can be identified with the respective time of day.

Still yet another object of the present invention is to provide a method of using a motor vehicle time speed recorder that includes the steps of initializing a set time, causing the clock signal pen, by the continuously running clock motor, to draw a substantially sinusoidal time curve on a roll of recording paper tape time portion of a roll of recording paper tape of the motor vehicle time speed recorder when the motor vehicle is moving and when the motor vehicle is not moving the clock signal pen draws only one oscillating vertical line on the roll of recording paper tape time portion each time the ignition switch of the motor vehicle is in the off position, causing a speed signal pen of the motor vehicle time speed recorder, by a speed signal from the speedometer of the motor vehicle, to draw a speed curve on a roll of recording paper tape speed portion of the roll of recording paper tape below and synchronized with the substantial sinusoidal time curve, and advancing the roll of recording paper tape through an elongated slot in a front of a hollow parallelepiped-shaped housing, by the tape motor.

Finally, still yet another object of the present invention is to provide a method of using a motor vehicle time speed recorder that further includes the step of advancing manually the roll of recording paper tape through the elongated slot in the front of the hollow parallelepiped-shaped housing by a paper advance knob.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the present invention illustrated with a typical recording issuing therefrom;

FIG. 2 is a first block diagram of the present invention;

FIG. 3 is a diagrammatic pictorial representation illustrating how the time graph signal is created;

FIG. 4 is a second block diagram of the present invention; and FIG. 5 is a diagrammatic illustration of a portion of a typical recording created by the present invention.

LIST OF REFERENCE NUMERALS UTILIZED IN THE DRAWING 10 motor vehicle time speed recorder of the present invention
12 hollow parallelepiped-shaped housing
14 housing front
16 housing front elongated slot
18 housing side
20 housing side throughbore
22 roll of recording paper tape
24 roll of recording paper tape exposed portion
26 recording paper tape advance knob
28 continuously running clock motor
30 conventional car battery
32 tape motor
34 conventional car ignition switch
36 speed coil
38 conventional car speedometer
40 clock motor shaft
42 clock motor circular disk
44 clock motor circular disk perimeter
45 clock motor elongated arm proximal end
46 clock motor elongated arm
47 clock motor elongated arm distal end
48 clock signal pen
50 substantial sinusoidal time curve
52 time curve ordinate axis
54 time curve 12 o'clock noon point
56 time curve 12 o'clock midnight point 57 time curve 6 o'clock am point
58 set time step
60 roll of recording paper tape time portion
62 speed output signal
64 speed signal pen
66 speed curve
68 roll of recording paper tape speed portion
70 motor vehicle speed corresponding to 12 o'clock noon
72 time curve 6 o'clock pm point
74 motor vehicle speed corresponding to 6 o'clock pm
78 motor vehicle speed corresponding to 12 o'clock midnight
80 motor vehicle speed corresponding to time curve 12 o'clock midnight point to the time curve 6 o'clock am point period of time
82 time curve oscillating vertical line
84 speed curve single vertical line
86 motor vehicle resumed speed corresponding to 6 o'clock am

DETAILED DESCRIPTION OF THE PREFERRED EMBODIMENT

Referring now to the figures in which like numerals indicate like parts, and particularly to FIG. 1, the motor vehicle time speed recorder of the present invention is shown generally at 10.

The motor vehicle time speed recorder 10 includes a hollow parallelepiped-shaped housing 12 that has a housing front 14 with a housing front elongated slot 16 and a housing side 18 with a housing side throughbore 20.

A roll of recording paper tape 22 is rotatively mounted within the hollow parallelepiped-shaped housing 12 and has a roll of recording paper tape exposed portion 24 that is extendable through the housing front elongated slot 16 of the housing front 14 of the hollow parallelepiped-shaped housing 12.

A recording paper tape advance knob 26 passes through the housing side throughbore 20 of the housing side 18 of the hollow parallelepiped-shaped housing 12 and is fixedly attached to the roll of recording paper tape 22, so that the roll of recording paper tape exposed portion 24 of the roll of recording paper tape 22 can be further manually extended through the housing front elongated slot 16 of the housing front 14 of the hollow parallelepiped-shaped housing 12.

As shown in FIG. 2, the motor vehicle time speed recorder 10 includes a continuously running clock motor 28 that is powered by a conventional car battery 30, a tape motor 32 that is powered by the conventional car battery 30 and is in series with a conventional car ignition switch 34, so that the tape motor 32 is operative only when the conventional car ignition switch 34 is in the on position, and a speed coil 36 that receives a signal from a conventional car speedometer 38.

It is to be understood that since the speed coil 36 receives a signal from the conventional car speedometer 38 and not from a conventional tachometer (not shown), the speed coil only operates when the motor vehicle (not shown) is in movement and not when it is idling.

As shown in FIG. 3, the continuously running clock motor 28 has a speed of one revolution per every twenty four hours and has a clock motor shaft 40 that extends longitudinally therefrom.

A clock motor circular disk 42 that has a clock motor circular disk perimeter 44 is fixedly attached at its center to the clock motor shaft 40 of the continuously running clock motor 28.

A clock motor elongated arm proximal end 45 of a clock motor elongated arm 46 is pivotally mounted to the clock motor circular disk perimeter 44 of the clock motor circular disk 42.

The clock motor elongated arm 46 has a clock motor elongated arm distal end 47 to which a clock signal pen 48 is fixedly attached.

Since the continuously running clock motor 28 revolves once every twenty four hours and since the clock motor elongated arm 46 is pivotally mounted to the clock motor circular disk perimeter 44 of the clock motor circular disk 42, the clock signal pen 48 draws a substantial sinusoidal time curve 50 on the roll of recording paper tape 22 when the tape motor 32 is operative. The time curve ordinate axis 52 originates at a time curve 12 o'clock noon point 54 and terminates at a time curve 12 o'clock midnight point 56 and that points therebetween represent both PM and AM depending upon the upwardly and downwardly directions, respectively, of the substantial sinusoidal time curve 50.

It is to be understood, however, that since the continuously running clock motor 28 runs continuously regardless if the conventional car ignition switch 34 is in the on position or not and since the tape motor 32 runs only when the conventional car ignition switch 34 is in the on position, when the tape motor 32 is not running, the clock signal pen 48 draws only one oscillating vertical line on the roll of recording paper tape 22 each time the conventional car ignition switch 34 is not in the on position. With this arrangement, the roll of recording paper tape 22 is not advanced and unnecessarily used when the motor vehicle (not shown) is not running.

The operation of the motor vehicle time speed recorder 10 can best be seen in FIG. 4, and as such, will be discussed with reference thereto.

A set time step 58 is initialized so that the continuously running clock motor 28 is set to correspond to the actual time and that the position of the clock signal pen 48 is properly set. This may not always be necessary, but is important to verify that the continuously running clock motor 28 is set to correspond to the actual time and that the position of the clock signal pen 48 is properly set, since the conventional car battery 28 may have run down or may have become completely dead, which will alter the results.

The continuously running clock motor 28 causes the clock signal pen 48 to draw the substantial sinusoidal time curve 50 (see FIG. 1) on a roll of recording paper tape time portion 60 of the roll of recording paper tape 22.

When the motor vehicle (not shown) is in motion, a speed output signal 62 generated from the conventional car speedometer 38 causes the speed coil 36 to cause a speed signal pen 64 to draw a speed curve 66 (see FIG. 1) on a roll of recording paper tape speed portion 68 of the roll of recording paper tape 22 below and synchronized with the substantial sinusoidal time curve 50.

When the results are required, the recording paper tape advance knob 26 is manually rotated and the roll of recording paper tape exposed portion 24 of the roll of recording paper tape 22 is removed.

An example of a portion of a result displayed on the roll of recording paper tape 22 can best be seen in FIG. 5, and as such, will be discussed with reference thereto.

It is to be understood, however, that the example of the portion of the result displayed on the roll of recording paper tape 22 is for illustrative purposes only.

The substantial sinusoidal time curve 50 starts at the time curve 12 o'clock noon point 54 on the roll of recording paper tape time portion 60 of the roll of recording paper tape on 24. The motor vehicle speed corresponding to 12 o'clock noon 70 is shown to be 50 miles per hour on the speed curve 66 of the roll of recording paper tape 22.

At a time curve 6 o'clock pm point 72 on the substantial sinusoidal time curve 50 of the roll of recording paper tape time portion 60 of the roll of recording paper tape 22, the motor vehicle speed corresponding to 6 o'clock pm 74 is shown also to be 50 miles per hour on the speed curve 66 of the roll of recording paper tape speed portion 68 of the roll of recording paper tape 22.

At the time curve 12 o'clock midnight point 56 on the substantial sinusoidal time curve 50 of the roll of recording paper tape time portion 60 of the roll of recording paper tape 22, the motor vehicle speed corresponding to 12 o'clock midnight 78 is shown to be 70 miles per hour on the speed curve 66 of the roll of recording paper tape speed portion 68 of the roll of recording paper tape 22.

From the time curve 12 o'clock midnight point 56 to a time curve 6 o'clock am point 57 on the substantial sinusoidal time curve 50 of the roll of recording paper tape time portion 60 of the roll of recording paper tape 22, the motor vehicle speed corresponding to time curve 12 o'clock midnight point 56 to the time curve 6 o'clock pm point 57 period 80 of time is shown to be 0 miles per hour on the speed curve 66 of the roll of recording paper tape speed portion 68 of the roll of recording paper tape 22.

This situation is created since the motor vehicle (not shown) was not moving and the substantial sinusoidal time curve 50 of the roll of recording paper tape time portion 60 of the roll of recording paper tape 22 therefore assumes a time curve oscillating vertical line 82 and the speed curve 66 of the roll of recording paper tape speed portion 68 of the roll of recording paper tape 22 is a speed curve single vertical line 84.

At the time curve 6 o'clock am point 57 on the substantial sinusoidal time curve 50 of the roll of recording paper tape time portion 60 of the roll of recording paper tape 22, the motor vehicle resumes motion and the motor vehicle resumed speed corresponding to 6 o'clock pm 86 is shown to be 30 miles per hour on the speed curve 66 of the roll of recording paper tape speed portion 68 of the roll of recording paper tape 22.

It will be understood that each of the elements described above, or two or more together, may also find a useful application in other types of constructions differing from the types described above.

While the invention has been illustrated and described as embodied in a motor vehicle time speed recorder, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A method of using a motor vehicle time speed recorder, the motor vehicle having a battery, a speedometer, and an ignition switch, comprising the steps of:

a) initializing a set time, so that a continuously running clock motor of a time means of said motor vehicle time speed recorder is set to correspond to the actual time and that the position of a clock signal pen of said motor vehicle time speed recorder is properly set so as to assure that said continuously running clock motor is set to correspond to the actual time and that the position of said clock signal pen is properly set, since the battery of the motor vehicle may have run down or may have become completely dead, which will alter results;

b) causing said clock signal pen, by said continuously running clock motor, to draw a substantially sinusoidal time curve on a roll of recording paper tape time portion of a roll of recording paper tape of said motor vehicle time speed recorder when the motor vehicle is moving since said continuously running clock motor revolves once every twenty four hours and an elongated rod of said time means is pivotally mounted to a perimeter of a circular disk of said time means and when the motor vehicle is not moving, said clock signal pen draws only one oscillating vertical line on said roll of recording paper tape time portion each time the ignition switch of the motor vehicle is in the off position, so that said roll of recording paper tape is not advanced and unnecessarily used when the motor vehicle is not running;

c) causing a speed signal pen of said motor vehicle time speed recorder, by a speed signal from the speedometer of the motor vehicle, to draw a speed curve on a roll of recording paper tape speed portion of said roll of recording paper tape below and synchronized with said substantial sinusoidal time curve; and d) advancing said roll of recording paper tape through an elongated slot in a front of a hollow parallelepiped-shaped housing, by said tape motor, so that said substantially sinusoidal time curve and said speed curve can be compared and the speed for a particular time can be determined.

2. The method as defined in claim 1; further comprising the step of advancing manually said roll of recording paper tape through said elongated slot in said front of said hollow parallelepiped-shaped housing by a paper advance knob.

3. The method as defined in claim 1, wherein said hollow parallelepiped-shaped housing further has a side with a throughbore.

4. The method as defined in claim 1, wherein said time means is disposed in said hollow parallelepiped-shaped housing.

5. The method as defined in claim 1, wherein said speed signal pen is included in speed means which is disposed in said hollow parallelepiped-shaped housing.

6. The method as defined in claim 1, wherein said continuously running clock motor of said time means has a longitudinal shaft that extends therefrom and is powered directly by the battery of the motor vehicle regardless of the position of the ignition switch of the motor vehicle.

7. The method as defined in claim 1, wherein said circular disk of said time means has a center.

8. The method as defined in claim 7, wherein said circular disk of said time means is fixedly attached at said center of said circular disk of said time means to a longitudinal shaft of said continuously running clock motor of said time means.

9. The method as defined in claim 1, wherein said elongated rod of said time means has a proximal end and a distal end.

10. The method as defined in claim 9, wherein said proximal end of said elongated rod of said time means is pivotally mounted to said perimeter of said circular disk of said time means.

11. The method as defined in claim 1, wherein said speed signal from the speedometer of the motor vehicle is received by a speed coil.

12. The method as defined in claim 9, wherein said clock signal pen of said time means is fixedly attached to said distal end of said elongated rod of said time means.

13. The method as defined in claim 11, wherein said speed signal pen is operatively connected to said speed coil.

14. The method as defined in claim 11, wherein said roll of recording paper tape is operatively connected to a tape motor disposed in said hollow parallelepiped-shaped housing.

15. The method as defined in claim 14, wherein said tape motor is powered by the battery of the motor vehicle and is in series with the car ignition switch of the motor vehicle, so that said tape motor is operative only when the ignition switch of the motor vehicle is in an on position and since said speed coil receives said speed signal from the speedometer of the motor vehicle and not from a tachometer, said speed coil operates only when the motor vehicle is in movement and not when it is idling.

16. The method as defined in claim 3, wherein said paper advance knob extends through said throughbore in said side of said hollow parallelepiped-shaped housing and is operatively connected to said roll of recording paper tape.

17. The method as defined in claim 1, wherein said roll of recording paper tape is divided into two longitudinal graphical portions.

18. The method as defined in claim 17, wherein one of said two longitudinal graphical portions of said roll of recording paper tape displays said substantially sinusoidal time curve.

19. The method as defined in claim 17, wherein another of said two longitudinal graphical portions of said roll of recording paper tape displays said speed curve.

* * * * *